United States Patent [19]
Härdmark et al.

[11] Patent Number: 4,732,239
[45] Date of Patent: Mar. 22, 1988

[54] ANTI-SKID DEVICE

[75] Inventors: Ragnar M. Härdmark; Göte Törnebäck, both of Linköping, Sweden

[73] Assignee: Onspot AB, Linkoping, Sweden

[21] Appl. No.: 925,492

[22] Filed: Oct. 29, 1986

Related U.S. Application Data

[63] Continuation of Ser. No. 711,950, Mar. 15, 1985, abandoned.

[30] Foreign Application Priority Data

Mar. 15, 1984 [SE] Sweden ............................ 8401456

[51] Int. Cl.$^4$ ................................................ B60T 1/04
[52] U.S. Cl. ..................................... 188/4 B; 152/208; 152/221
[58] Field of Search ............... 188/4 R, 4 B; 152/208, 152/214, 216, 213 R, 213 A, 221, 222; 180/16

[56] References Cited

U.S. PATENT DOCUMENTS

| | | |
|---|---|---|
| 1,403,270 | 1/1922 | Small ................................. 188/4 B |
| 2,747,691 | 5/1956 | Lakey et al. ..................... 188/4 B |
| 2,865,471 | 12/1958 | Chaussee ........................ 188/4 B |
| 2,886,138 | 5/1959 | Bruner ............................ 188/4 B |
| 4,299,310 | 11/1981 | Törnebäck . | 
| 4,621,712 | 11/1986 | Hardmark ..................... 188/4 B |
| 4,657,118 | 4/1987 | Andersson ..................... 188/4 R |

FOREIGN PATENT DOCUMENTS 1162216 1/1964 Fed. Rep. of Germany .
2036889 12/1970 France .

Primary Examiner—Donald E. Czaja
Assistant Examiner—Thomas Bokan
Attorney, Agent, or Firm—Cushman, Darby & Cushman

[57] ABSTRACT

Anti-skid device especially for motor vehicle comprising elastic arms (2) assembled to a disc unit. In use the disc unit is brought close to the vehicle wheel, the friction of which is to be increased, and the outer ends (3) of the arms are successively drawn in between wheel and ground to increase the friction. Apart from their friction increasing portion (3) the arms (2) are extremely elastic and extend practically to the centre of rotation and bearing of the disc. Above the arms there is arranged a disc (5) extending out to the vicinity of the transition of the arms (2) into the friction increasing members (3). Moreover, beneath the arms a ring (6) is arranged which is attached between the arms (2) to the points (7) of attachment of the disc. In this way the disc is given a plane appearance ensuring that the friction increasing members (3) of the arms can obtain defined feed-in positions relative to the vehicle wheel.

16 Claims, 3 Drawing Figures

ANTI-SKID DEVICE

This is a continuation of application Ser. No. 711,950, filed 3/15/85, which was abandoned upon the filing hereof.

This invention relates to so-called automatic anti-skid devices. In this connection "automatic" does not mean that the anti-skid devices are activated automatically when the roads get slippery, but instead they can be activated by the driver during a ride. The idea of an anti-skid device of this type has been known for a relatively long time and means in respect of the so far successively marketed single model that short chain pieces arranged on a pulley are thrown in under a vehicle wheel by the rotation of the pulley when this is forced to contact with the said wheel. However, the use of anti-skid protections of this type has only been possible with trucks as the space is enough there to allow of application of the entire equipment required inclusive of the position of rest of the pulley provided with chains. Moreover, only trucks are so expensive that they can stand the additional costs of these automatic anti-skid protections. However, the need for an automatic anti-skid protection operated from the driving compartment is great in private cars, also, especially against the background that many countries do not permit studded tires. In the Alpine countries of Europe this often means that snow chains must repeatedly be taken on and off. It should also be mentioned in this connection that a careful adjustment of the working position of the chain pulley relative to the vehicle wheel is necessary for a good function of the known devices. For cars with front wheel drive in particular, as well as cars with independent rear suspension this makes the use of chain pulleys impossible. Moreover, very great forces necessarily appear in use. A further drawback of known techniques is the fact that the chairs must be thrown under the vehicle wheel by the rotation of of the pulley. Then the chains exert a braking force on the rotation of the pulley, which thus skids against the side of the vehicle wheel. This is less desirable in private cars than in trucks as the tires are more delicate. Furthermore, the known device cannot be used thus on a stationary car without a preceding wheel spin which is directly dangerous in traffic in private cars as a consequence of higher power/weight conditions. In view of the above problems it is the object of the invention to provide an automatic anti-skid device which is so compact that it can be used with private cars, with an uncritical position relative to the vehicle wheel, and which can start its function also at a slow start of the car from a standstill position. Moreover, a device for private cars must give a low increase of the sound level and be useful at high speeds.

A further problem with private cars is the need of a skid protection also at the front wheels, whether these are driving or only guiding. Of course it is a desideratum that the skid protection should not only be fully efficient at movements straight ahead but also when the car is on lock. Lock means however, that very great differences in radius will occur between the position where the wheel starts to roll over the skid protection and where this is again released, respectively. Moreover, it must be considered that some modern cars have a geometry being such that the contact surface between wheel and ground is moved laterally as well as longitudinally relative to the car at steering movements.

Thus, it is required from an adequate skid protection that it must be extremely flexible and, moreover, must have a sufficient stiffness or stability to ensure a correct adaptation. These requirements are quite contradictory to each other and have so far resulted in that nobody has even tried to achieve automatic skid protections for private cars and, in particular, their front wheels.

The above problems are solved in accordance with the invention in that, in the first place the apparently incompatible claims on flexibility and stiffness are completely disregarded and priority is exclusively given to the flexibility. Thus, what is essential according to the invention is that one or more elements increasing friction, conveniently arranged as spokes in a disc, are elastic and then, primarily, in radial direction. However, the spokes are preferably also pliable to be able to cope with the angles between the spokes and the friction increasing member lying beneath the wheel. This angle changes when the car is moving.

In order to obtain, in particular, a great radial elasticity it is suitable that the arms are elastic all the way to the centre of rotation of the disc or close to this.

In order to meet in a further development of the inventive thought the demands on sufficient stiffness and guiding of the spokes when these are to be positioned under the wheel with their ends and in connection with parking of the device, stiffness or damping means are arranged at the spokes which limit the freedom of movement within certain limits. This is possible as in the first place a very great elasticity is necessary in radial direction and, secondly, it is important that the spokes or the arms in the neighborhood of the friction increasing member may be angled in the plane of the disc. In this way it is possible to arrange the stiffening members in the form of means only damping and guiding, respectively, the movement of the spokes perpendicularly to the plane of the disc. This can be carried out in a relatively simple way using preferably a light, elastic disc or several discs arranged above or below the spokes or arms. Alternatively, each spoke may be enclosed in an elastic tubular element, e.g. in the form of a helical spring. In analogy with this it is of course also possible that the arms are hollow and take up in their internal cavity a stiffening or damping element which can ensure the necessary stiffening.

It is intended at the inventive object, in the first place, that the disc should be rotated by the arms being held between wheel and ground while the car is moving forwards, as distinguished from the so far known, single, functioning devices provided with chains where a special element is used to speed up the chain pulley so that the chains are thrown in between wheel and ground. However, it is quite possible within the scope of the invention to have the stiffening means abut on wheel and/or ground to define the position relative to the wheel as well as achieve an extra drive of the device.

The elastic arms or spokes are preferably made of rubber and a rubber or plastic material can also be used for the stiffening means, possibly in the form of a disc. However, as the stiffening means need not allow a great radial elongation these can be reinforced and in this way easily be given the stability of form required. The disc-shaped element provided with arms or spokes is preferably relatively plane with the spokes perpendicular to the axis of rotation. The arms are preferably arranged considerably tigter than what is the case when using chains. As the disc is plane in position of rest it is easy to give this a place under the car. As the disc is rotated by the arms being gripped successively no certain minimum speed is required for function but the device can start to operate from a stationary position. The number of arms and the distance between these at the periphery are less than half the length of the contact surface of the vehicle wheel so that at least two arms are constantly between wheel and ground.

In order to improve the increase of friction the arms or spokes in the part coming into contact between wheel and ground can be provided with friction increasing members of the type studs or the like and it can also be suitable to form the arms with such a width in this section that there is no risk of upset, rotation or turning. These studs can neither be disposed straight through the friction increasing members or more or less diagonally in these in view of the fact that the force transmission at drive as well as braking will take place in diagonal direction. As the arms are elastic and can be extended and bent in use the risk of disturbance as a consequence of deposits in the form of ice, snow or the like, which can be obtained at long drives with the friction element in parking position, will be eliminated.

As a consequence of the great elasticity of the friction increasing arms no great stresses arise on the bearing of the disc and its attachment, and therefore the support can be given moderate dimensions and, accordingly, weight and space.

Further advantages and properties of the invention will appear from the description below of an illustrative example shown on the drawings.

Figure 1:
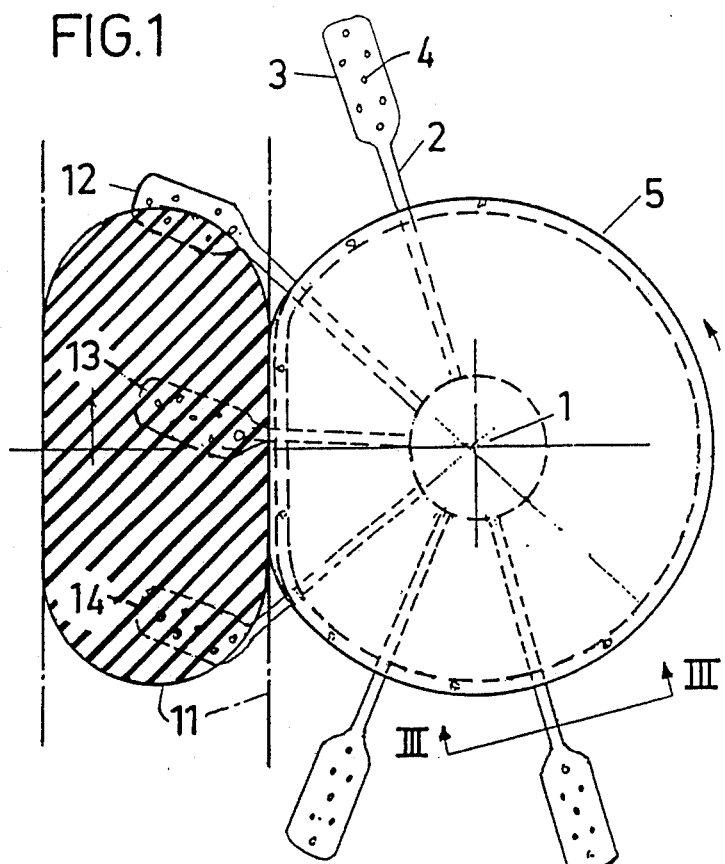
FIG. 1 shows the inventive device as seen from above.
Figure 3:
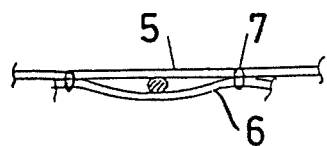
FIG. 3 is a section taken on the line III—III in FIG. 1.
Figure 2:
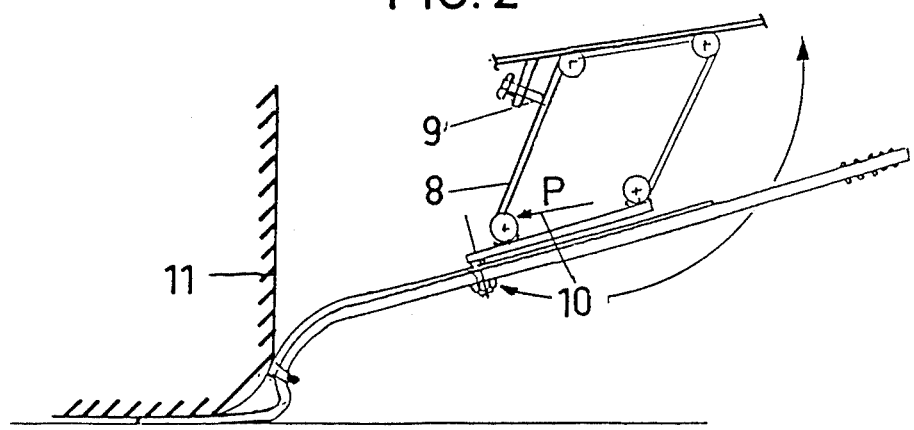
FIG. 2 is a front view of the device.

The friction increasing device consists in the first place of arms attached in the vicinity of the bearing 1, which are flexible vertically and laterally and elastic longitudinally. The outer ends 3 of the arms are wider to prevent the arms from rotating or rolling under the vehicle wheel. Besides, the arms are provided with studs 4 in the outer ends. The arms are made of rubber and without reinforcement at least in the part extending from the attachment to the friction increasing outer end 3. As a consequence of this and the angle length of the arm this can be stretched very strongly in radial direction. The fact is that it allows of stretching of 50–100%.

As is evident, the angular position between the friction increasing outer end 3 and the part of the arm which is substantially radial all the time from the throw-in position 12 to the extended position 14, changes. It is very easy for the elastic arm to adapt itself also to this.

In order to collect the extremely elastic arms 2 to a disc-shaped element a disc 5 is arranged above these which is arranged as rotating together with the arms above the latter. At the periphery of the disc there is an elastic ring 6 which lies under the arms. The ring 6 is attached to the disc 5 between the arms (at 7).

The disc 5, the ring 6 and the points of attachment 7 do not only serve to stiffen up the device to a disc-like element but will also function to damp motion of the arms 2. Otherwise the arms will easily perform so great pivotations in radial, tangential or normal direction, when they come out from their held-fast position between wheel and ground, that it would disturb their repeated throw under the wheel. However, these movements will have time to be damped during the rotation of the arm until the next throw-in.

In the case shown the overhead disc 5 will abut on the side of the wheel and is then bent. The disc-like traction device is attached via the bearing 1 to a parallelogram mounting 8 which is actuated, when the device is activated, by an outwardly directed force 10 until the parallelogram 8 will abut on a stop 9. The device 8 is either attached to a part of the wheel suspension of the car or at a suitable place of the car body. As a consequence of the great elasticity of the device it is possible for it to adapt itself to the spring and steering movement of the vehicle at the same time as a good function is continuously guaranteed.

Since the anti-skid device is rotated when the friction increasing arms or spokes are successively drawn in between ground and wheel it is necessary with a tangential coupling between the arms. As mentioned above, this can be achieved by means of the stiffening members. However, it is very well possible within the scope of the invention that this function is accomplished by a lateral connection between the arms, e.g. immediately inside the friction increasing flat portion. These lateal connections can be more or less elastic and either free of the stiffening members or, as an alternative, cooperating with these. It is even possible that the damping and stiffening members do not influence directly on the arms but via these members connecting the arms laterally.

Within the scope of the invention it is imaginable that the arms are framework constructions and then, in particular, in vertical direction. In the simplest case the framework can consist of a triangle, in this way a vertical stiffening can be achieved.

What we claim is:

1. A device for increasing the friction or grip between the tires of an automobile and the ground comprising a rotatable, substantially disc-shaped member to which are attached arms, which arms are fed successively and continuously between the tire and the ground, characterized in that said arms are made of unreinforced rubber allowing a radial stretching of said arms in use of 50–100%.

2. The device of claim 1, characterized in that said disc member is brought to rotation when the arms are successively drawn in between wheel and ground.

3. The device of claim 1 characterized in that the disc is substantially plane when in said storage position.

4. The device of claim 1, characterized in that the flexible portion of the arms extends to the vicinity of the bearing center of the disc.

5. The device of claim 1, characterized in that the disc shape is achieved by stiffening members.

6. The device of claim 5, characterized in that the stiffening members consist of a first disc arranged above or below the radial arms.

7. The device of claim 6, characterized in that a second disc or ring is arranged on the outer side of the arms connected to said first disc between the elastic arms.

8. The device of claim 5, characterized in that the stiffening members comprise elastic tubular elements attached to the center of rotation of the arms for simultaneous rotation.

9. The device of claim 1 characterized in that said movement means includes a stop.

10. The device of claim 1, characterized in that said flexible arms are provided with flat contact elements at their outer ends to prevent said elements from rolling under the wheels.

11. The device of claim 1 characterized in that the part of the arm introduced between the vehicle wheel and the ground is provided with friction increasing members.

12. The device of claim 11, characterized in that the friction increasing members are arranged alternately diagonally which is substantially in the direction of force.

13. The device of claim 1, characterized in that the arms are laterally interconnected.

14. The device of claim 1, characterized in that the arms and the entire disc member is a framework.

15. The device of claim 1 characterized in that said friction increasing members are metal inserts.

16. The device according to claim 1 wherein said arms are hollow and tubular and wherein a stiffening member is disposed within said arm.

* * * * *